March 17, 1964 — H. L. WITTEK — 3,125,075
DUAL INLET PASSAGES FOR INTERNAL COMBUSTION ENGINES
Filed Nov. 20, 1961

Inventor
Hans L. Wittek
By Charles L. Schwab
Attorney

United States Patent Office 3,125,075
Patented Mar. 17, 1964

3,125,075
DUAL INLET PASSAGES FOR INTERNAL COMBUSTION ENGINES
Hans L. Wittek, Flossmoor, Ill., assignor to Allis-Chalmers Manufacturing Company, Milwaukee, Wis.
Filed Nov. 20, 1961, Ser. No. 153,315
3 Claims. (Cl. 123—30)

This invention relates to inlet passages for an internal combustion engine and particularly to dual inlet passages for an engine using at least two intake valves per cylinder.

In prior art devices air has been directed to a pair of inlet ports to a cylinder through one or more passages. However, in such prior art constructions the interaction of the valves on the air flow causes a varying distribution of flow through each valve, and accordingly optimum volumetric efficiency is not obtained. Also in some prior art constructions, the air directed by the inlet passages to the cylinder has not been directed so as to produce a unidirectional swirl of air within the cylinder. In such prior art arrangements excessive turbulence of air results in poor volumetric efficiency. Thus, the amount of air drawn or forced into the cylinder is not as great as it might otherwise be with a unidirectional swirl of air. Also inlet passages of some prior art constructions have taken up an excessive amount of head space and have required complicated intake manifolding.

It is an object of this invention to provide a pair of improved inlet passages which direct the air into the cylinder adjacent the side wall thereof to swirl unidirectionally within the cylinder.

It is a further object of this invention to provide inlet passages to a pair of inlet ports of an engine cylinder which require minimum head space and simplify manifolding requirements.

It is a further object of this invention to provide a pair of streamlined inlet passages to a pair of cylinder inlet ports which provide optimum volumetric efficiency through minimizing interaction of the valves on the inlet air flow.

It is a further object of this invention to provide inlet passages for a pair of engine cylinder ports which minimize interaction of the intake valves on the air flow and which direct the air into the cylinder tangentially to the cylindrical side wall thereof.

It is a further object of this invention to provide a pair of upper and lower siamesed inlet ports wherein the upper passage has a vertical side wall which is common to a wall portion of the head in which the intake valve for the lower passage is positioned.

These and other object of this invention will be apparent when the following description is read in conjunction with the drawings in which.

Figure 2:
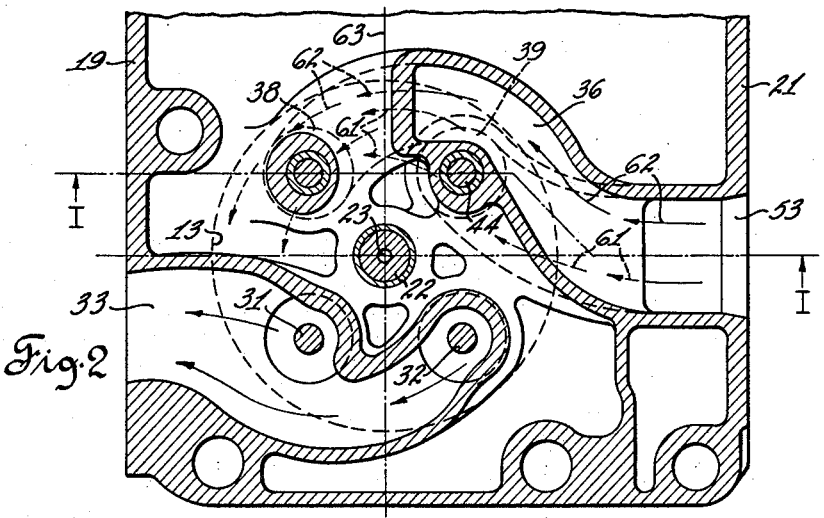
FIG. 2 is a section view taken along the line II—II of FIG. 1.
Figure 1:
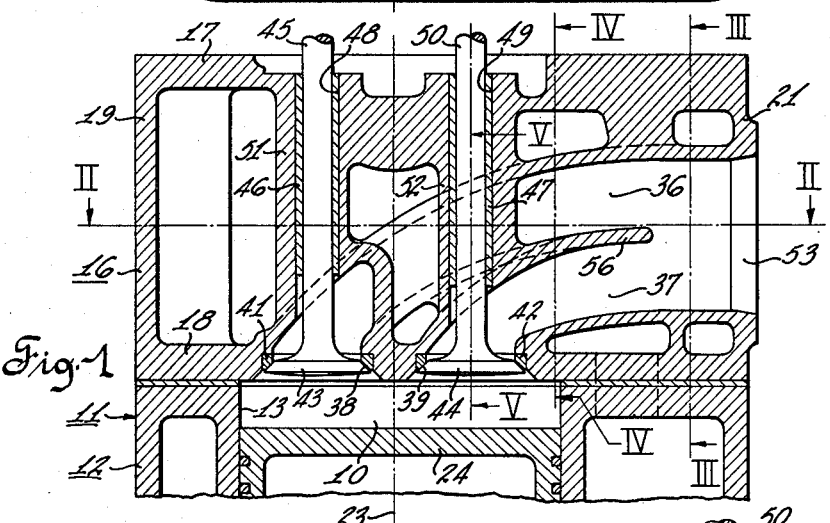
FIG. 1 is a transverse vertical section view of an engine incorporating this invention taken along the line I—I of FIG. 2.
Figure 3:
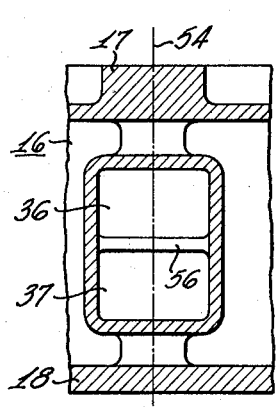
FIG. 3 is a section view taken along the line III—III of FIG. 1.
Figure 4:
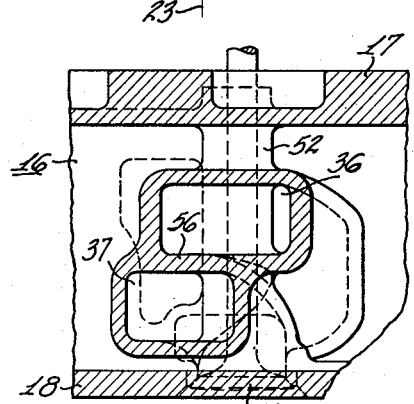
FIG. 4 is a section view taken along the line IV—IV of FIG. 1.

Referring to FIGS. 1 and 2 an internal combustion engine 11 of the compression ignition type is illustrated. The engine has a lower block portion 12 which includes a cylinder 10 defined by a cylindrical side wall 13 and a head portion 16 having a top wall 17, a bottom wall 18 and longitudinally extending vertical side walls 19 and 21. The engine is of the overhead valve type, is water cooled and employs a vertically disposed fuel injection nozzle 22 concentric with the axis 23 of the cylinder 10 and piston 24 therein. A pair of exhaust valves 31, 32 are employed to exhaust burned gases from the cylinder through exhaust passage 33.

This invention is concerned with the provision of a pair of highly efficient inlet passages 36, 37 for directing air to the cylinder 10 through inlet ports 38, 39 respectively. Valve seat inserts 41, 42 are installed in the inlet ports 38, 39, respectively, in a conventional manner. The inlet ports 38, 39 are alternately opened and closed by a pair of intake valves 43, 44 which have stem portions 45, 50 reciprocally mounted in valve sleeves 46, 47. The valve sleeves are press fitted in bores 48, 49 in vertical wall portions 51, 52 between the top and bottom walls 17, 18 of the head portion 16. An air inlet opening 53 is provided in the side wall 21 at a position where it is intersected by a transverse plane 54 passing through the axis 23 of the cylinder 10. Air entering opening 53 is divided between the upper and lower inlet passages 36 and 37 by a dividing wall 56 common to the two passages. This dividing wall 56 divides the incoming air a substantial distance from the inlet ports 38, 39 to permit the two passages 36 and 37 to be streamlined, thus minimizing turbulence in the inlet air flow. The inlet passages are smoothly curved and there are no abrupt changes in their cross sectional area.

It will be noted that the lower inlet passage 37, as viewed in FIG. 2, directs the air from the inlet opening 53, disposed on the transverse plane 54, inwardly and longitudinally away from the plane 54 in the direction of the inlet valves to direct the air passing through the inlet port 39 tangentially to the side wall 13 of the cylinder 10. The arrows 61 illustrate the direction of flow of the air through the near inlet port 39. As shown in FIG. 1 the passage 37 approaches port 39 at an acute vertical angle to the bottom wall 18. The upper inlet passage 36 smoothly curves away from transverse plane 54 around the vertically disposed intake valve 44 and thence downwardly in a smooth curve, and at an acute vertical angle to the bottom wall 18, to the remote intake valve port 38. The air is directed through the port 38 by the passage 36 so as to flow into the cylinder 10 tangentially to its side wall 13. The flow of air through passage 36 into the cylinder is indicated by the arrows 62. The streamlined passages 36, 37 are of gradually decreasing cross section as they approach the ports 38, 39. Thus the air passing from the opening 53 to the ports 38, 39 is smoothly accelerated. Abrupt changes in cross sectional area of the passages would tend to create turbulences having a detrimental effect upon volumetric efficiency.

It will be noted that the inlet ports 38, 39 are disposed on laterally opposite sides of the longitudinal plane 63 passing through the axis 23 of the cylinder. It will also be noted that the inlet ports 38, 39 are disposed above the cylinder 10 adjacent to the side wall 13 thereof. The direction of flow imparted to the air by the passages 36, 37 induces the air entering the cylinder to swirl unidirectionally in a counterclockwise direction, as viewed in FIG. 2. This directing of intake air through streamlined passages 36, 37 to the cylinder permits a maximum amount of air to be delivered to the cylinder for combustion thus permitting optimum volumetric efficiency. The unidirectional swirl also induces complete combustion of the fuel and air mixture as well as good volumetric efficiency. Upon compression of the gases within the cylinder, the swirling of the air continues and induces proper mixing of injected fuel with the air. Thus it is important to impart the desired characteristics of motion to the input air as it enters the cylinder in order to obtain efficient combustion. This is achieved by locating the inlet ports adjacent the cylinder side wall 13 and directing the air tangentially to the cylinder side wall as previously explained.

Figure 5:
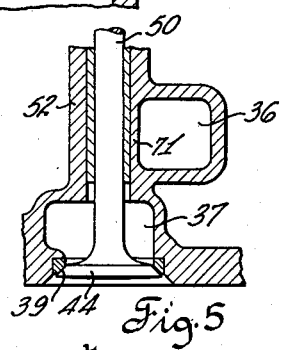
FIG. 5 is a section view taken along the line V—V of FIG. 1.

The upper inlet passage as illustrated in FIG. 5 has a vertical side wall portion 71 which is common to the vertical wall 52 in which the stem portion 50 of intake valve 44 is reciprocally mounted. Further, as shown in FIG. 5, it will be noted that the upper passage is above the portion of passage 37 opening into inlet port 39.

From the foregoing description it is evident that applicant has provided a novel inlet passage arrangement for a compression ignition engine wherein air enters a single side opening in the head portion of the engine and is divided and directed between inlet ports to swirl in the cylinder unidirectionally. Utilizing a single opening 53 simplifies the intake manifold construction and the siamese inlet passages 36, 37 reduce the space requirements in the head portion 16. The two streamlined inlet passages 36, 37 direct air through inlet ports 38, 39 located near the side wall 13 of the cylinder, tangentially to the cylinder side wall to induce the air to swirl undirectionally in the cylinder. This construction provides excellent volumetric efficiency and complete burning of fuel by virtue of effective mixing of air and fuel.

Although a single embodiment of this invention has been illustrated, modifications may be made without departing from the scope of the invention defined by the appended claims.

What is claimed is:

1. A cylinder head for an internal combustion engine of the type having a pair of intake valves disposed on opposite sides of a longitudinal plane through the axis of the cylinder associated with said valves and spaced in one longitudinal direction from a transverse plane through said axis at right angles to said longitudinal plane, said head comprising: a bottom wall, a longitudinally extending vertical side wall, a pair of inlet ports for said valves in said bottom wall at laterally opposite sides, respectively, of said longitudinal plane, walls defining a first streamlined passage extending from a portion of said side wall intersected by said transverse plane inwardly toward said axis and curving in said one longitudinal direction toward the one of said ports nearest said side wall in tangential relation to said cylinder and downwardly to said one port at an acute vertical angle to said bottom wall, and walls defining a second streamlined passage extending vertically above said first passage from said side wall inwardly and in said one longitudinal direction around the intake valve for said one port on the side thereof remote from said axis and thence curving to a tangential relationship with said cylinder and sloping downwardly to the other port at an acute vertical angle to said bottom wall, said passages being effective upon installation of said head on said engine to direct air tangentially to the cylinder wall of said cylinder and downwardly through said ports, respectively, at an acute vertical angle thereby inducing said air to swirl unidirectionally about the axis of said cylinder.

2. The structure set forth in claim 1 and further comprising a vertical bore formed in a vertical side wall portion of said walls defining said second passage, said bore being adapted to receive a valve stem guide for the valve associated with said one port.

3. A cylinder head for an internal combustion engine of the type having a pair of intake valves disposed on opposite sides of a longitudinal plane through the axis of the cylinder associated with said valves and spaced in one longitudinal direction from a transverse plane through said axis at right angles to said longitudinal plane, said head comprising: a bottom wall, a longitudinally extending vertical side wall, a pair of inlet ports for said valves in said bottom wall at laterally opposite sides, respectively, of said longitudinal plane, walls defining a first streamlined passage of gradually decreasing cross section extending from said side wall inwardly toward said axis thence curving in said one longitudinal direction toward the one of said ports nearest said side wall in tangential relation to said cylinder and downwardly to said one port at an acute vertical angle to said bottom wall, and walls defining a second streamlined passage of gradually decreasing cross section extending from said side wall inwardly on the side of the intake valve for said one port remote from said axis and thence curving to a tangential relationship with said cylinder and sloping downwardly to the other port at an acute vertical angle to said bottom wall, said passages being effective upon installation of said head on said engine to direct air tangentially to the cylinder wall of said cylinder and downwardly through said ports, respectively, at an acute vertical angle thereby inducing said air to swirl unidirectionally about the axis of said cylinder.

References Cited in the file of this patent

UNITED STATES PATENTS

| | | |
|---|---|---|
| 2,318,914 | Anderson et al. | May 11, 1943 |
| 3,020,896 | Meurer et al. | Feb. 13, 1962 |
| 3,045,655 | Formia | July 24, 1962 |
| 3,054,390 | Meurer | Sept. 18, 1962 |

FOREIGN PATENTS

| | | |
|---|---|---|
| 136,762 | Australia | Mar. 20, 1950 |
| 1,264,423 | France | May 8, 1961 |
| 861,173 | Germany | Dec. 29, 1952 |
| 868,525 | Great Britain | May 17, 1961 |